July 10, 1945.  J. H. ROETHEL  2,379,923
WINDOW GUIDE
Filed Jan. 2, 1941  2 Sheets-Sheet 1
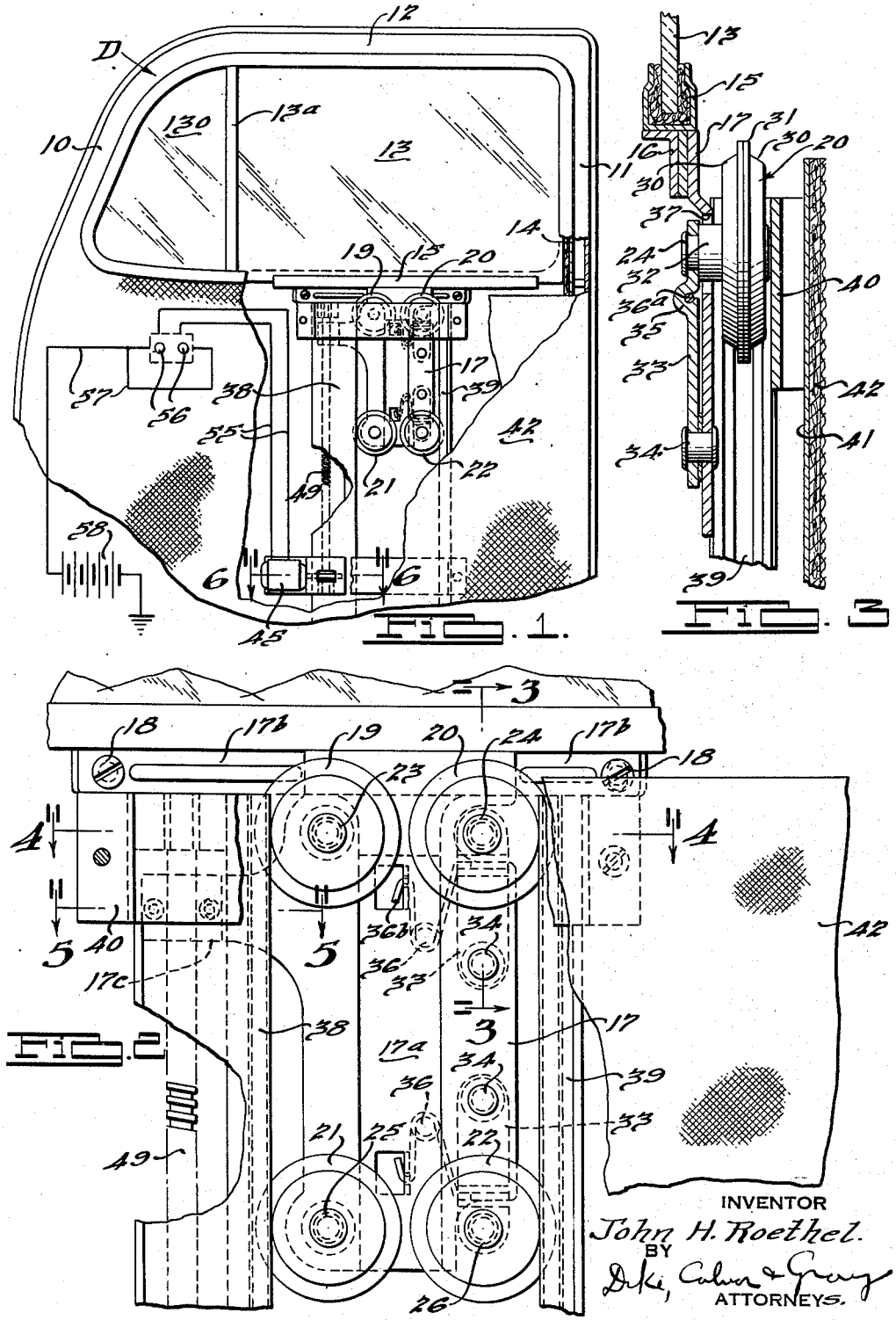
INVENTOR
John H. Roethel.
BY
ATTORNEYS.

July 10, 1945.  J. H. ROETHEL  2,379,923
WINDOW GUIDE
Filed Jan. 2, 1941  2 Sheets-Sheet 2
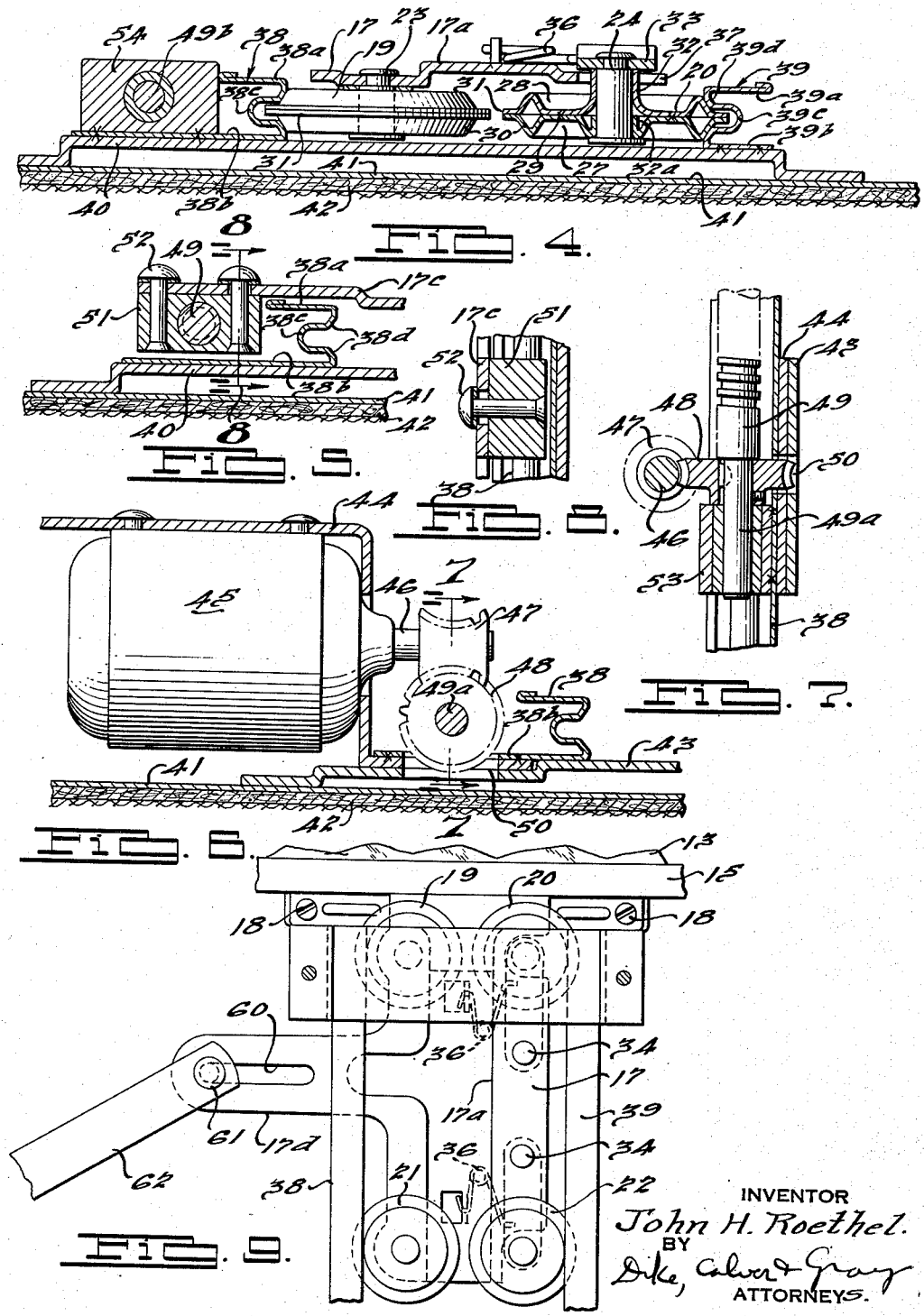

Patented July 10, 1945

2,379,923

UNITED STATES PATENT OFFICE 2,379,923

WINDOW GUIDE

John H. Roethel, Detroit, Mich., assignor to Marvel Equipment Corporation, Detroit, Mich., a corporation of Michigan Application January 2, 1941, Serial No. 372,901

4 Claims. (Cl. 296—48)

This invention relates to window control mechanism, particularly although not exclusively adapted for use in connection with vehicles and especially automobiles. In general the invention contemplates the provision of improved means for guiding the window panel in the desired path, usually in a vertical direction in connection with the principal windows of present day automobiles.

Another object of the invention is to provide guiding means for guiding the window panel, such guiding means including improved guide devices or roller guide devices cooperable with fixed guides within the window well and effective not only to hold the window panel against any appreciable tilting in its plane but also to reduce to a minimum frictional resistance to the travel of the panel, thus minimizing the power required to operate the window panel.

A further object of the invention is to provide improved guiding means for the window glass or panel which may be arranged below and near the center of the panel, the improved construction of the guiding means being such as to hold the window panel for travel in a straight line path against any material tendency to tilt or cock or shift transverse to its plane.

It is also an object of the invention to provide improved roller guide mechanism for a sliding window panel which is compact, relatively simple in construction, easy to install, relatively inexpensive to manufacture, efficient and more nearly frictionless in operation than heretofore.

A further object of the invention is to provide an improved center or intermediate guide structure for a window panel, particularly useful in connection with automotive vehicles, in which a pair of vertically spaced guide devices on the lower edge of the panel, particularly rollers or wheels, cooperate with a fixed guide in the window well and are normally held in one guiding position through resilient means such as a pair of vertically spaced roller guide devices adapted to travel upon a second fixed guide in the window well, the construction and arrangement being such as to provide a simple, compact and efficient guiding means for the window panel by which frictional losses are greatly minimized or reduced.

Other objects of this invention will appear in the following description and appended claims, reference being had to the accompanying drawings forming a part of this specification wherein like reference characters designate corresponding parts in the several views.

Fig. 1 is an inner fragmentary side elevation, partly broken away and partly in section, of an automobile door embodying the invention.

Fig. 2 is an enlarged fragmentary elevation illustrating the upper portion of the window guide mechanism of Fig. 1.

Fig. 3 is an enlarged vertical section taken substantially through lines 3—3 of Fig. 2 looking in the direction of the arrows.

Fig. 4 is an enlarged horizontal section taken substantially through lines 4—4 of Fig. 2 looking in the direction of the arrows.

Fig. 5 is a section taken substantially through lines 5—5 of Fig. 2 looking in the direction of the arrows.

Fig. 6 is an enlarged section taken substantially through lines 6—6 of Fig. 1 looking in the direction of the arrows.

Fig. 7 is a section taken substantially through lines 7—7 of Fig. 6 looking in the direction of the arrows.

Fig. 8 is a section taken substantially through lines 8—8 of Fig. 5 looking in the direction of the arrows.

Fig. 9 is a view somewhat similar to Fig. 2, in smaller scale, illustrating the manner in which the roller guide carrier may be connected to a manually operable window regulator.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there are illustrated certain embodiments of the invention applied, by way of example, to an automobile door, such as the front door of an automobile. It will be understood, however, that the embodiments herein exemplified in part or in whole may be used in other relations and in other window structures. In particular it will be understood that the guiding means and the window glass operating mechanism may be utilized not only conjointly as herein shown but also separately, and these may be used generally in vehicle bodies or the like in connection with various types of window panels which are adapted to be shifted between open and closed positions.

In Fig. 1 there is illustrated a front door D of an automobile including upright side pillars 10 and 11 joined by a header 12, thus providing a window frame in the form of a closed figure defining a main window opening adapted to be closed in part by means of a vertically slidable glass or other transparent panel 13. In the present instance the remaining portion of the window opening is closed by means of a wing type panel 13O of conventional type, the panels 13 and 13O being separated by a vertical guide bar 13a which may either be attached to the forward edge of the panel 13 or fixed within the window opening to provide a guide for the corresponding edge of the panel 13 when raised and lowered. The window frame pillar 11 may be provided with a groove or glass runway channel 14 terminating at the bottom of the window opening and designed to receive the corresponding edge of the panel 13.

Secured to the lower edge of the glass panel 13 is a channel bar or glass retainer member 15 to which the window regulator is adapted to be connected. A depending angle member 16 having a top horizontal flange is spot welded to the bottom of the retainer channel 15. A roller guide carrier plate 17, T-shaped in construction, is adapted to be detachably connected to the depending flange of the angle bar 16. The plate 17 below the angle 16 is suitably embossed at 17a for reenforcement and for clearance purposes and the upper laterally extending ends 17b of the T-shaped carrier are provided with holes for the reception of screws 18 by which the carrier may be secured to the angle 16 and, hence, to the glass retainer channel 15. One of the screws 18, as shown in Fig. 2, is adjustable in a vertical slot in the depending flange of the angle 16, thereby permitting the window panel to be adjusted slightly in an angular direction with respect to the carrier plate 17.

The window panel 13 is guided in a generally vertical direction through the medium of roller or wheel type guide devices cooperable with fixed upright channel guides mounted entirely within the window well below the lower edge of the window opening. In the present instance there are four of these roller guide devices arranged in pairs with the rollers of each pair spaced vertically. There are two upper rollers designated 19 and 20 and two lower rollers designated 21 and 22. The rollers 19 and 21 constitute one pair and the rollers 20 and 22 constitute the second pair. The rollers 19 and 21 are mounted in bodily fixed relation upon the carrier plate through the medium of pivot studs 23 and 25, respectively, these studs being riveted to the carrier plate and the rollers or wheels 19 and 21 being suitably journalled upon the studs at one side of the carrier plate, see Fig. 4. The rollers 20 and 22 are journalled upon studs 24 and 26, respectively, which, as hereinafter described, are movably mounted with respect to the carrier plate.

As illustrated particularly in Figs. 3 and 4, each of the rollers is preferably of a two-piece construction formed from metal stampings. Referring to Fig. 4, the roller 20 comprises two stamped pieces or sections 27 and 28 embossed at 29 to provide abutting faces which are spot welded together. Toward the outer margin of the roller or wheel 20 the stampings have generally V-shaped annular ribs which in the assembled structure form outer converging tapered faces 30 providing spaced annular tracking surfaces for the roller. Extended outwardly from the tapered tracking surfaces 30 and located intermediate thereof is a projecting annular lip or rim 31 formed by the adjacent peripheral edges of the stampings. The hub of the stamping 27 is flanged inwardly at 32a to provide an annular bearing and in like manner the stamping 28 is flanged at 32 to provide an annular bearing in line with the bearing 32a. These flanged portions bear and rotate upon the stud 24 and it will be seen with reference to Fig. 4 that the bearing portions 32 and 32a form a closed pocket surrounding the stud 24 which is adapted to receive grease for lubrication purposes. All of the rollers are constructed in substantially the same manner as above described with the exception that the fixed rollers 19 and 21 have shorter bearings at 32 than as shown in connection with the rollers 20 and 22.

The studs 24 and 26 which revolubly support the rollers 20 and 22 are riveted to the outer ends of swinging roller supporting arms 33. These arms extend in reverse directions and each is pivoted at 34 to the carrier plate 17. As shown in Fig. 3, each arm 33 is embossed at 35 and formed with a groove or notch into which one end 36a of a spring 36 in anchored. Each spring 36 is formed with an intermediate coil or coils and the opposite end 36b thereof is anchored to a lug struck out from the plate 17. The carrier plate 17, see Fig. 4, has at each end a slot or cut away portion 37 through which extend the studs 24 and 26 and the surrounding bearing portions 32 of the rollers, the slots permitting limited movement of the rollers in a longitudinal or fore and aft direction. The limit of movement of each roller against the action of its spring 36 is governed by the end of the slot 37.

The rollers 19 and 21 are adapted to travel along a fixed upright channel guide 38 and correspondingly the rollers 20 and 22 are adapted to travel along a fixed upright channel guide 39. The channel guide 38 comprises spaced side flanges 38a and 38b joined by a web which is rolled or otherwise formed with a longitudinal groove or channel 38c merging into the inner ends of the side flanges by means of flared or reversely tapered tracks 38d. In like manner, the channel guide 39 is formed with a central longitudinal groove or channelway 39c in the central web thereof which extends intermediate the parallel side flanges 39a and 39b. The sides of the groove 39c in like manner merge into the side flanges by spaced flared or reversely tapered tracking surfaces 39d. The inner flange 38b of the channel guide 38 is elongated or widened and the upper end thereof is spot welded to an upper embossed bracket 40 secured to the inner pressed metal door panel 41, the latter being covered at its inner face by the usual trim panel 42. The lower end of the flange 38b is spot welded to a lower embossed bracket 43 secured to the inner door panel 41. In like manner, the flange 39b of the channel guide 39 is secured as by spot welding at its upper and lower ends to the brackets 40 and 43.

In the embodiment illustrated in Figs. 1 to 8 inclusive the carrier 17 and, hence, the window panel 13 are shifted in a vertical direction by means of an electrically driven mechanism including an electric motor mounted at the lower end of the channel guide 38. As shown in Fig. 6, an angularly formed bracket 44 is spot welded to the bracket 43 through the medium of a flange of the bracket 44 interposed between the channel guide flange 38b and an embossed portion of the bracket 43. Housed within the bracket 44 is an electric motor 45 secured thereto by rivets. This motor has an armature shaft 46 carrying a worm 47 which meshes with a worm wheel or gear 48 secured to the lower reduced end 49a of a worm shaft 49, this end being piloted in a bearing formed in a lower journal block 53 carried by the bracket 44. As shown in Figs. 6 and 7, the worm shaft as well as the worm gear 48 are arranged in the general longitudinal plane of the guide 38 and the brackets 43 and 44 and the flange 38b have clearance slots 50 for the gear 48.

The carrier 17 adjacent the upper end of the channel guide 38 has an extension 17c, see Fig. 5. A nut block 51 is secured by rivets 52 to the extension 17c, this block having a worm threaded hole therethrough to receive the upper end of the worm shaft 49, the threads of the worm shaft cooperating with the threads of the hole in the block 51. The upper end 49b of the worm shaft is journalled in a bearing in an upper block 54 secured to the upper bracket 40, see Fig. 4. The motor 45 is suitably wired at 55 to a control panel having control buttons 56 which in turn is wired at 57 to the battery 58. By pushing one of the buttons 56 the motor will be driven in one direction and by pushing the other button the motor will be driven in the opposite direction. Thus, the motor may be operated to drive the worm shaft 49 in one direction or the other and the cooperation of this shaft with the nut block 51 on the carrier 17 will drive the carrier either upwardly or downwardly as desired, thereby raising or lowering the window panel 13.

Referring to the embodiment illustrated in Fig. 9, in this instance the power regulator is replaced by a manually operable window regulator of any suitable construction. A conventional single arm regulator having a swinging arm 62 may be connected through a stud 61 to a longitudinal or horizontal slot 60 in an extension 17b of the carrier 17. By cranking the window regulator to swing the arm 62 the carrier 17 and, hence, the window panel will be raised or lowered.

As will be clearly seen from Fig. 4 the converging tapered tracking surfaces of the rollers smoothly engage the correspondingly tapered tracks of the upright channel guides. These tracks assist in holding the rollers on the tracks. Furthermore, any material displacement of the rollers with respect to the guides in directions transverse to the plane of the window panel is prevented by the annular projecting flanges 31 of the rollers which extend between the sides of the channels or grooves 38c and overlap the same. The distance that the rollers 20 and 22 may be retracted against the action of their springs 36 is limited by the slots 37 and is insufficient to permit the flanges 31 of the opposite rollers to back out of the guide channels under extreme conditions.

It will be seen that the present construction provides a very simple and easy installation of the window glass 13 on the assembly line. The carrier plate 17, the driving mechanism and the roller guide devices carried thereby may all be mounted within the window well before it is necessary to install the window panel 13. This panel may be installed by tilting it into the window opening and dropping the lower edge down through the slot along the lower edge of the window opening. It may then be quickly attached to the carrier plate by screws 18. Very substantial savings in time and assembly line costs are thus obtained by virtue of this invention.

I claim:

1. Guiding means for a window panel mounted for up and down movement in a vehicle body having a window well, comprising a depending carrier adapted to be secured to the lower edge of the panel, two pairs of vertically spaced rollers, one pair being mounted on the carrier to yield longitudinally relative to the other pair, and a pair of fixed upright guides within the well upon which the rollers of each pair are adapted to travel, the mounting for said yielding pair of rollers comprising swinging arms carrying the rollers and springs cooperating with the arms.

2. Guiding means for a window panel mounted for up and down movement in a vehicle body having a window well, comprising a depending carrier adapted to be secured to the lower edge of the panel, two pairs of vertically spaced rollers, one pair being mounted on the carrier to yield longitudinally relatively to the other pair, a pair of fixed upright guides within the well upon which the rollers of each pair are adapted to travel, the mounting for said yielding pair of rollers comprising swinging arms carrying the rollers and springs cooperating with the arms, and means for limiting the range of swinging movement of the arms in one direction.

3. Guiding means for a sliding window panel, comprising a guide in the form of a channel having side flanges terminating in a central web formed with a channel or groove provided with sides terminating in flared tracks diverging outwardly relative to said sides, and a roller adapted to be carried by the panel comprising spaced annular tracking surfaces converging inwardly and having rolling engagement with said tracks, said surfaces terminating in a central annular projection fitting between said sides of the guide.

4. Guiding means for a window panel mounted for up and down movement in a vehicle body having a window well, comprising a depending carrier adapted to be secured to the lower edge of the panel, two pairs of vertically spaced rollers, one pair being mounted on the carrier to yield longitudinally relative to the other pair, and a pair of fixed upright guides within the well upon which the rollers of each pair are adapted to travel, the mounting for each yielding roller comprising spring pressed means for swingingly supporting the roller.

JOHN H. ROETHEL.